(12) United States Patent
Hu et al.

(10) Patent No.: US 11,457,392 B2
(45) Date of Patent: Sep. 27, 2022

(54) HANDOVER METHOD AND APPARATUS

(71) Applicant: HUAWEI TECHNOLOGIES CO., LTD., Guangdong (CN)

(72) Inventors: Xingxing Hu, Shanghai (CN); Hongping Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/111,200

(22) Filed: Dec. 3, 2020

(65) Prior Publication Data

US 2021/0092661 A1 Mar. 25, 2021

Related U.S. Application Data

(63) Continuation of application No. PCT/CN2019/092328, filed on Jun. 21, 2019.

(30) Foreign Application Priority Data

Jun. 22, 2018 (CN) .......................... 201810654981.X

(51) Int. Cl.
*H04W 36/26* (2009.01)
*H04W 28/02* (2009.01)
*H04W 36/14* (2009.01)

(52) U.S. Cl.
CPC ....... *H04W 36/26* (2013.01); *H04W 28/0268* (2013.01); *H04W 36/14* (2013.01)

(58) Field of Classification Search
CPC . H04W 36/26; H04W 28/0268; H04W 36/14; H04W 28/02; H04W 36/00;
(Continued)

(56) References Cited

U.S. PATENT DOCUMENTS 10,798,754 B2 * 10/2020 Pan .................. H04W 28/0268
11,044,643 B2 * 6/2021 Centonza .......... H04W 36/0058
(Continued)

FOREIGN PATENT DOCUMENTS

CN 104363598 A 2/2015
CN 107018542 A 8/2017
(Continued)

OTHER PUBLICATIONS

Ha, Jeounglak, and Young-Il Choi. "Support of a multi-access session in 5g mobile network." 2019 25th Asia-Pacific Conference on Communications (APCC). IEEE, 2019. (Year: 2019).*
(Continued)

*Primary Examiner* — Sharad Rampuria
(74) *Attorney, Agent, or Firm* — Fish & Richardson P.C.

(57) ABSTRACT

Example handover methods and apparatus are described. One example method includes generating a handover request message or a handover requirement message by a source radio access network (RAN) device. The handover request message includes a first mapping relationship between downlink transmission of a quality of service (QoS) flow and a data radio bearer (DRB) and a second mapping relationship between uplink transmission of the QoS flow and a DRB that are configured by the source RAN device for a terminal device, where the two mapping relationships are different. The source RAN device sends the handover request message to a target RAN device, and forwards data of the terminal device on the source RAN device to the target RAN device in a process in which the terminal device is handed over from the source RAN device to the target RAN device.

16 Claims, 7 Drawing Sheets

(58) Field of Classification Search
CPC ............ H04W 36/18; H04W 36/0005; H04W 36/0007; H04W 36/0009; H04W 36/0016; H04W 36/03; H04B 7/18541; H04L 47/767
See application file for complete search history.

(56) References Cited

U.S. PATENT DOCUMENTS

| | | | |
|---|---|---|---|
| 2017/0339568 A1 | 11/2017 | Wang et al. | |
| 2019/0357075 A1* | 11/2019 | Van Der Velde | H04W 76/15 |
| 2019/0357086 A1* | 11/2019 | Palat | H04W 28/24 |
| 2020/0037197 A1* | 1/2020 | Cho | H04W 28/0263 |
| 2020/0100136 A1* | 3/2020 | Chang | H04W 28/0268 |
| 2020/0128452 A1* | 4/2020 | Centonza | H04W 80/08 |
| 2020/0213894 A1* | 7/2020 | Agiwal | H04W 76/12 |

FOREIGN PATENT DOCUMENTS

| | | |
|---|---|---|
| CN | 107302777 A | 10/2017 |
| CN | 107548127 A | 1/2018 |
| WO | 2018110952 A2 | 6/2018 |

OTHER PUBLICATIONS

3GPP TS 37.324 V15.0.0 (Jun. 2018), "3rd Generation Partnership Project;Technical Specification Group Radio Access Network;E-UTRA and NR;Service Data Adaptation Protocol (SDAP) specification (Release 15)," Jun. 2018, 13 pages.

3GPP TS 38.300 V0.6.0 (Aug. 2017), "3rd Generation Partnership Project;Technical Specification Group Radio Access Network;NR; NR and NG-RAN Overall Description;Stage 2(Release 15)," Aug. 2017, 58 pages.

3GPP TS 38.300 V15.1.0 (Mar. 2018), "3rd Generation Partnership Project; Technical Specification Group Radio Access Network; NR; NR and NG-RAN Overall Description; Stage 2 (Release 15)," Mar. 2018, 71 pages.

3GPP TS 38.300 V15.2.0 (Jun. 2018), "3rd Generation Partnership Project;Technical Specification Group Radio Access Network;NR; NR and NG-RAN Overall Description;Stage 2(Release 15)," Jun. 2018, 87 pages.

3GPP TS 38.323 V15.2 0 (Jun. 2018), "3rd Generation Partnership Project;Technical Specification Group Radio Access Network;NR;Packet Data Convergence Protocol (PDCP) specification(Release 15)," Jun. 2018, 26 pages.

3GPP TS 38.413 V1.0.0 (Jun. 2018), "3rd Generation Partnership Project;Technical Specification Group Radio Access Network;NG-RAN;NG Application Protocol (NGAP)(Release 15)," Jun. 2018, 265 pages.

3GPP TS 38.415 V1.0.0 (Jun. 2018), "3rd Generation Partnership Project;Technical Specification Group Radio Access Network;NG-RAN;PDU Session User Plane Protocol(Release 15)," Jun. 2018, 12 pages.

3GPP TS 38.423 V1.0.0 (Jun. 2018), "3rd Generation Partnership Project; Technical Specification Group Radio Access Network; NG-RAN; Xn application protocol (XnAP) (Release 15)," Jun. 2018, 3 pages.

CMCC, "QoS flow ID presence in the AS Reflective QoS," 3GPP TSG-RAN WG2 NR AdHoc, R2-1706999, Qingdao, China, Jun. 27-29, 2017, 3 pages.

CMCC, "Short QFI in SDAP header," 3GPP TSG-RAN WG2 Meeting #101 bis, R2-1805525, Sanya, China, Apr. 16-20, 2018, 3 pages.

Ericsson, "QoS Flow Remapping Within the Same Cell and in Handover," 3GPP TSG-RAN WG2 #98-AH, R2-1707161, Qingdao, P.R. China, Jun. 27-29, 2017, 6 pages.

Huawei, "Data forwarding with QoS flow relocation," 3GPP TSG-RAN3 Meeting #95bis, R3-171072, Spokane, Washington, USA, Apr. 3-7, 2017, 6 pages.

Huawei et al., "DL and UL QoS Flow to DRB mapping," 3GPP TSG-RAN WG2 Meeting#AH-1807, R2-1809974, Montreal, Canada, Jul. 2-6, 2018, 3 pages.

Huawei et al., "Further discussion on information for handover," 3GPP TSG-RAN WG2#101, R2-1802468, Athens, Greece, Feb. 26-Mar. 2, 2018, 5 pages.

Huawei et al., "QoS control for unstructured PDU sessions," 3GPP SA WG2 Meeting #122, S2-174690, San Jose Del Cabo, Mexico, Jun. 26-30, 2017, 7 pages.

Huawei et al., "Reflective QoS and Reflective DRB Mapping," 3GPP TSG-RAN2 NR Ad Hoc, R2-1700087, Spokane, Washington, USA, Jan. 17-19, 2017, 4 pages.

NTT DOCOMO et al., "Procedures for Dual Connectivity," SA WG2 Meeting #122, S2-174985, San Jose del Cabo, Mexico, Jun. 26-30, 2017, 10 pages.

Office Action issued in Chinese Application No. 201910597686.X dated Oct. 15, 2020, 4 pages.

Office Action issued in Chinese Application No. 201910597686.X dated Apr. 21, 2020, 30 pages (with English translation).

PCT International Search Report and Written Opinion issued in International Application No. PCT/CN2019/092328 dated Sep. 19, 2019, 22 pages (with English translation).

Search Report issued in Chinese Application No. 201910597686.X dated Feb. 10, 2020, 9 pages.

Ericsson, "Reflective QoS and Flow-ID," 3GPP TSG-RAN WG2 #98, R2-1704379, Hangzhou, China, May 15-19, 2017, 6 pages.

Extended European Search Report issued in European Application No. 19823238.1 dated Jun. 10, 2021, 10 pages.

Huawei, "Separate DL and UL Flow to DRB mapping in Handover," 3GPP TSG-RAN3 Meeting #101, R3-184864, Gothenburg, Sweden, Aug. 20-24, 2018, 2 pages.

LG Electronics Inc., "QoS handling in Handover," 3GPP TSG-RAN2 Meeting #99, R2-1709086, Berlin, Germany, Aug. 21-25, 2017, 2 pages.

* cited by examiner

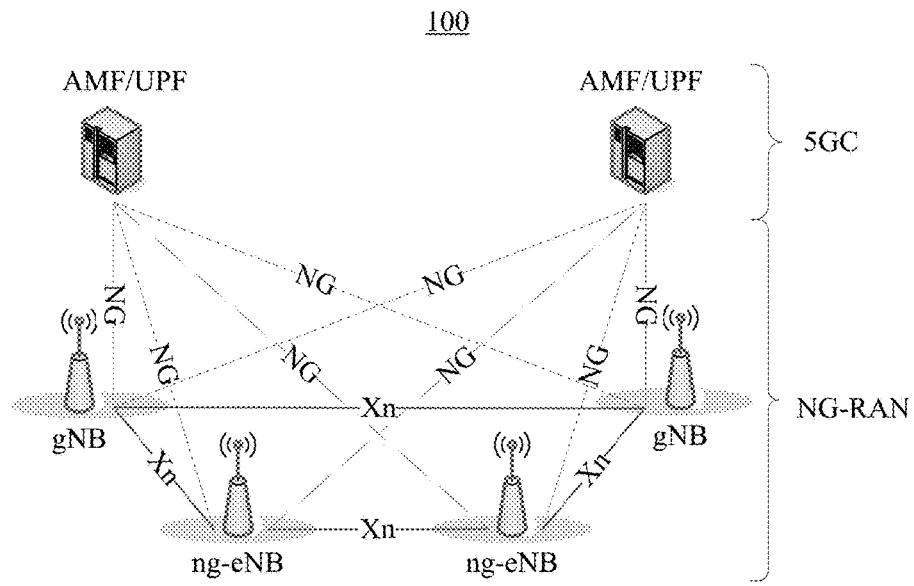
FIG. 1
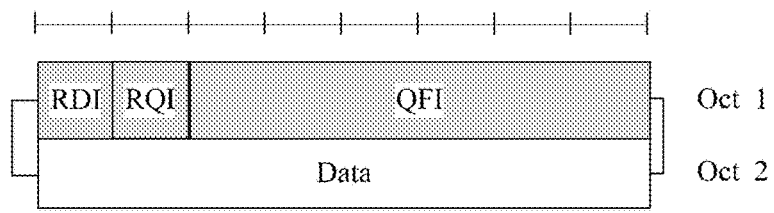
FIG. 2
| Bits | | | | | | | | Number of Octets |
|---|---|---|---|---|---|---|---|---|
| 7 | 6 | 5 | 4 | 3 | 2 | 1 | 0 | |
| PDU Type (= 0) | | | | Spare | | | | 1 |
| Spare | RQI or spare | QoS Flow Identifier | | | | | | 1 |
| Padding | | | | | | | | 0–2 |
FIG. 3

| Bits | | | | | | | | Number of Octets |
|---|---|---|---|---|---|---|---|---|
| 7 | 6 | 5 | 4 | 3 | 2 | 1 | 0 | |
| PDU Type (= 0) | | | | QoS Flow Identifier length | | | | 1 |
| Spare | RQI or spare | QoS Flow Identifier | | | | | | 1 |
| QoS Flow Identifier | | | | | | | | 1 |
| Padding | | | | | | | | 0–2 |

FIG. 4

HANDOVER METHOD AND APPARATUS

CROSS-REFERENCE TO RELATED APPLICATIONS

This application is a continuation of International Application No. PCT/CN2019/092328, filed on Jun. 21, 2019, which claims priority to Chinese Patent Application No. 201810654981.X, filed on Jun. 22, 2018. The disclosures of the aforementioned applications are hereby incorporated by reference in their entireties.

TECHNICAL FIELD

The present disclosure relates to the wireless communications field, and in particular, to a handover method and apparatus.

BACKGROUND

As wireless communications technologies rapidly develop, a 5th generation (5G) wireless communications technology has become a current research hotspot in the industry. The 5G supports various types of network deployment and application types, including higher-rate experience and a higher-bandwidth access capability, lower-latency high-reliability information exchange, access and management of a massive low-cost machine type communications device, and the like. To meet the foregoing requirement, the 5G defines a quality of service (QoS) management architecture based on a QoS flow, and defines a data packet transmission mechanism on an air interface based on a data radio bearer (DRB). One protocol data unit (PDU) session of a terminal device may include one or more data streams (such as internet protocol (IP) flows), where one or more data streams with a same QoS requirement form one QoS flow. Therefore, one PDU session includes one or more QoS flows. Data packets in one or more QoS flows may be carried on one DRB for transmission. Same forwarding processing, such as a same scheduling policy, a same queue management policy, and a same rate matching policy, is performed on the data packets that are in the one or more QoS flows and that are carried on the one DRB. In addition, an uplink data packet and a downlink data packet in a QoS flow may be carried on a same DRB, or may be separately carried on different DRBs.

A QoS flow in a PDU session is indicated by a corresponding QoS flow identifier (QFI). In an existing technical discussion result of Release 15 of 3GPP, a QFI is 6 bits in length. To be specific, one PDU session may include 0 to 63 QoS flows. For communication in some scenarios, one PDU session may include more QoS flows. Therefore, QFIs of different lengths may be used for different PDU sessions. For example, QFIs for some PDU sessions may be 6 bits in length, QFIs for some PDU sessions may be 8 bits in length, and QFIs for some PDU sessions may be 10 bits in length. Support for different QFI lengths may reflect a capability of each network element in communication. For example, some radio access network (RAN) devices can support 6-bit, 8-bit, and 10-bit QFIs, while some RAN devices can support only 6-bit QFIs. When the terminal device is handed over between different RAN devices, if the terminal device uses a 10-bit QFI when communicating with a source RAN device, but a target RAN device does not support the 10-bit QFI, that is, the source RAN device and the target RAN device have different QFI support capabilities, there is currently no proper solution for implementing data transmission of the terminal device after the handover.

SUMMARY

An embodiment of this application provides a handover method to ensure data transmission continuity when a terminal device is handed over between RAN devices that have different QFI support capabilities.

According to a first aspect, an embodiment of this application provides a handover method, and the method includes: sending, by a source radio access network RAN device, a handover request to a target RAN device, where the handover request includes information about a quality of service flow identifier QFI length configured by the source RAN device for a terminal device; receiving, by the source RAN device, a handover request acknowledgement from the target RAN device, where the handover request acknowledgement includes information about a QFI length configured by the target RAN device for the terminal device; sending, by the source RAN device, a handover command to the terminal device, where the handover command includes the information about the QFI length configured by the target RAN device for the terminal device; transferring, by the source RAN device, data to the target RAN device; and receiving, by the source RAN device, a terminal device context release instruction from the target RAN device.

In a possible implementation, the information about the QFI length is at least one of the following three parameters: a length value of the QFI, a value range of the QFI, and a length class of the QFI.

In a possible implementation, the transferring, by the source RAN device, data to the target RAN device includes: transferring the data to the target RAN device after the source RAN device adapts the QFI length configured by the source RAN device for the terminal device to the QFI length configured by the target RAN device for the terminal device.

According to the foregoing steps in this embodiment, the target RAN device performs corresponding admission control based on a QFI support capability of the source RAN device and a QFI support capability of the target RAN device. In this way, after the terminal device is handed over, service data can be transmitted by using a QFI supported by the target RAN device. This ensures continuity of service data transmission.

According to a second aspect, an embodiment of this application provides a handover method, and the method includes: receiving, by a target radio access network RAN device, a handover request from a source RAN device, where the handover request includes information about a quality of service flow identifier QFI length configured by the source RAN device for a terminal device; performing, by the target RAN device, admission control; sending, by the target RAN device, a handover request acknowledgement to the source RAN device, where the handover request acknowledgement includes information about a QFI length configured by the target RAN device for the terminal device; receiving, by the target RAN device, data transferred from the source RAN device; receiving, by the target RAN device, access of the terminal device; sending, by the target RAN device, a path transfer request to a core network CN device; receiving, by the target RAN device, a path transfer acknowledgement from the CN device; and sending, by the target RAN device, a terminal device context release instruction to the source RAN device.

In a possible implementation, the information about the QFI length is at least one of the following three parameters: a length value of the QFI, a value range of the QFI, and a length class of the QFI.

In a possible implementation, the performing, by the target RAN device, admission control includes: performing, by the target RAN device, admission control on the terminal device based on the information about the QFI length configured by the source RAN device for the terminal device and a QFI support capability of the target RAN device.

In a possible implementation, the receiving, by the target RAN device, data transferred from the source RAN device includes: receiving, by the target RAN device, data transferred after the source RAN device adapts the QFI length configured by the source RAN device for the terminal device to the QFI length configured by the target RAN device for the terminal device.

According to the foregoing steps in this embodiment, the target RAN device performs corresponding admission control based on a QFI support capability of the source RAN device and the QFI support capability of the target RAN device. In this way, after the terminal device is handed over, service data can be transmitted by using a QFI supported by the target RAN device. This ensures continuity of service data transmission.

According to a third aspect, a first access network device is provided, and is configured to perform the method in any one of the first aspect or the possible implementations of the first aspect. Specifically, the first access network device may include a unit configured to perform the method in any one of the first aspect or the possible implementations of the first aspect.

According to a fourth aspect, a second access network device is provided, and is configured to perform the method in any one of the second aspect or the possible implementations of the second aspect. Specifically, the second access network device may include a unit configured to perform the method in any one of the second aspect or the possible implementations of the second aspect.

According to a fifth aspect, a first access network device is provided, including a memory and a processor. The memory is configured to store a computer program, and the processor is configured to invoke the computer program from the memory and run the computer program, so that the first access network device performs the method in any one of the first aspect or the possible implementations of the first aspect.

According to a sixth aspect, a second access network device is provided, including a memory and a processor. The memory is configured to store a computer program, and the processor is configured to invoke the computer program from the memory and run the computer program, so that the second access network device performs the method in any one of the second aspect or the possible implementations of the second aspect.

According to a seventh aspect, a computer program product is provided, and the computer program product includes computer program code. When the computer program code is run by a communications unit and a processing unit, or a transceiver and a processor of a communications device (such as an access network device or a terminal device), the communications device is enabled to perform the method in any one of the first aspect, the second aspect, or the possible implementations of the first aspect and the second aspect.

According to an eighth aspect, a computer-readable storage medium is provided, where the computer-readable storage medium stores a program, and the program enables a computer to perform the method in any one of the first aspect, the second aspect, or the possible implementations of the first aspect and the second aspect.

These aspects and other aspects of the present disclosure are simpler and easier to understand in descriptions of the following (a plurality of) embodiments.

BRIEF DESCRIPTION OF DRAWINGS

The following briefly describes the accompanying drawings used for describing embodiments in this application or the prior art.

FIG. 1 shows a network side part of a communications system according to an embodiment of this application.

FIG. 2 shows a format of an SDAP protocol data unit according to an embodiment of this application.

FIG. 3 is a schematic diagram of a format of a PDU session container according to an embodiment of this application.

FIG. 4 is a schematic diagram of a format of an enhanced PDU session container according to an embodiment of this application.

DESCRIPTION OF EMBODIMENTS

Figure 5:
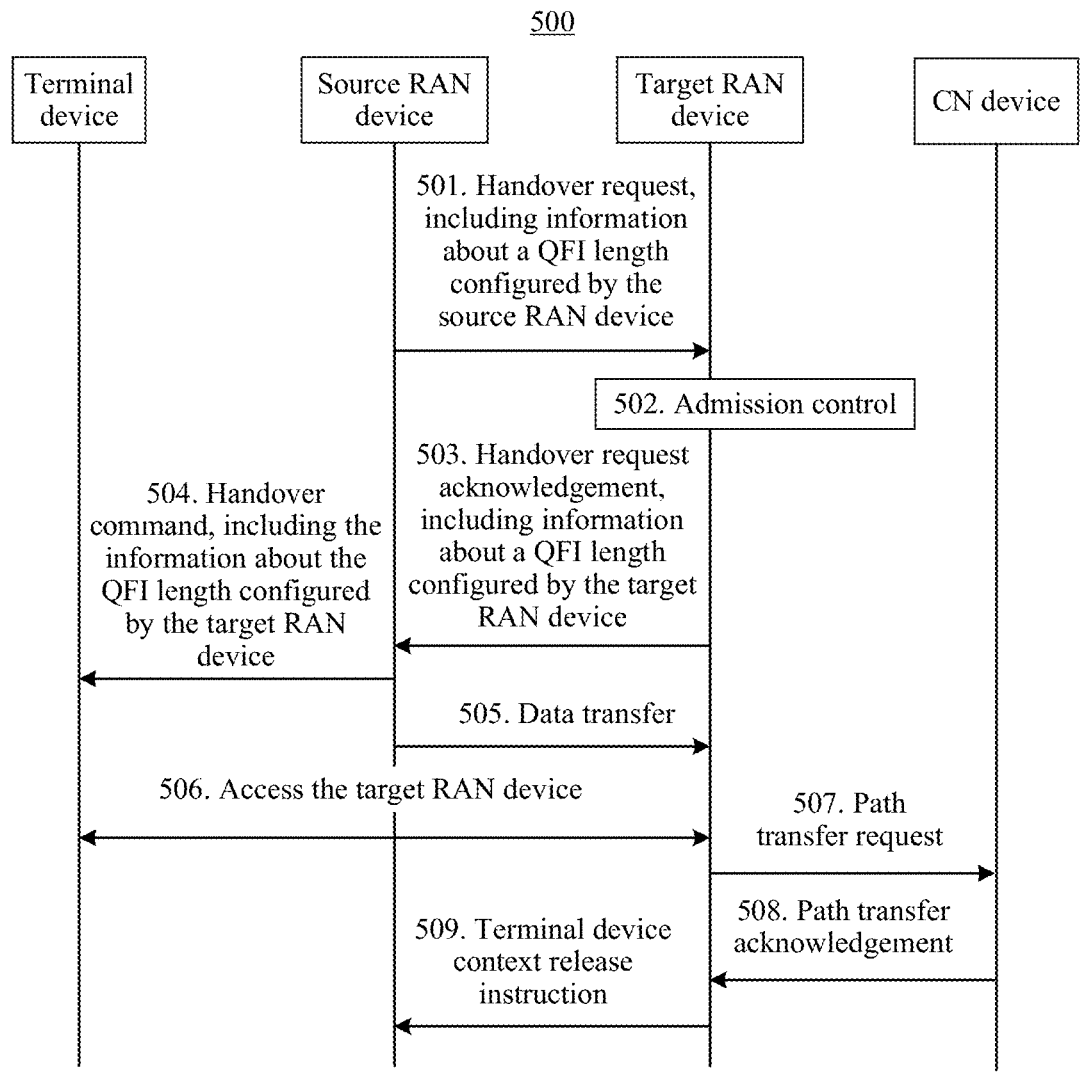
FIG. 5 is a schematic diagram of a handover procedure according to an embodiment of this application.

The following describes the embodiments of this application with reference to the accompanying drawings in the embodiments of this application.

In this application, the term "example" is used to represent "giving an example, an illustration, or a description". Any embodiment described as an "example" in this application is not necessarily interpreted as being more preferred or having more advantages than another embodiment. To enable any person skilled in the art to implement and use the present disclosure, the following description is provided. In the following description, details are listed for a purpose of interpretation. It should be understood that, a person of ordinary skill in the art can learn that the present disclosure can be implemented without using these specific details. In other instances, well-known structures and processes are not described in detail to avoid obscuring the description of the present disclosure with unnecessary details. Therefore, the present disclosure is not limited to the illustrated embodiments, but is consistent with the widest scope that complies with principles and features disclosed in this application.

In the specification, claims, and accompanying drawings of the present disclosure, the terms "first", "second", "third", "fourth", and the like (if existent) are intended to distinguish between similar objects, but do not necessarily describe a specific order or sequence. It should be understood that the data termed in such a way is interchangeable in proper circumstances so that the embodiments of the present disclosure described herein can be implemented in other orders in addition to the order illustrated or described herein. Moreover, the terms "include", "have", and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Specific embodiments are used below to describe in detail the technical solutions of the present disclosure. The following several specific embodiments may be combined with each other, and a same or similar concept or process may not be described repeatedly in some embodiments.

A handover method and apparatus that are provided in the embodiments of this application are applicable to handover of a terminal device when different RAN devices have different QFI support capabilities.

Usually, a communications system includes a terminal device and a network side device. FIG. 1 shows a network side part 100 of a communications system according to an embodiment of this application. The network side part 100 includes a next generation core (NGC) (also referred to as 5GC) and a next generation radio access network (NG-RAN). The 5GC mainly includes a control plane network element (such as an access and mobility management function (AMF) and a session management function (SMF)), and a user plane function (UPF). The AMF is mainly responsible for access and mobility management on the terminal device. The SMF is mainly responsible for session management, terminal IP address assignment, and the like. The UPF is mainly responsible for data packet routing and forwarding, QoS management, and the like. The AMF, the SMF, and the UPF may also be referred to as core network (CN) devices. A network element in the NG-RAN mainly includes a next generation base station, such as a next generation NodeB (gNB) or a next generation evolved NodeB (ng-eNB). The gNB and the ng-eNB are also referred to as RAN devices, and provide user plane and control plane functions. An interface between the 5GC and the NG-RAN may be defined as an NG interface. Specifically, a control plane interface between the 5GC and the NG-RAN may be defined as an NG-C interface, and a user plane interface between the 5GC and the NG-RAN may be defined as an NG-U interface. An interface between different network elements (such as two gNBs) in the NG-RAN may be defined as an Xn interface. It should be understood that the names of the interfaces are examples, and the interfaces may be alternatively defined as other names. This is not limited in this embodiment of this application.

The network element in the NG-RAN in FIG. 1 may be alternatively an access point (AP) in a wireless local area network (WLAN), a base transceiver station (BTS) in GSM (Global System for Mobiles) or CDMA (Code Division Multiple Access), a NodeB (NB) in WCDMA (Wideband Code Division Multiple Access), a relay station, an access point, a vehicle-mounted device, a wearable device, a network device in a future 5G network, or an access network device in a future evolved public land mobile network (PLMN), for example, may be a transmission and reception point (TRP), a centralized processing unit (CU), or a distributed processing unit (DU). It should be understood that the terminal device communicates with the network element in the NG-RAN by using a transmission resource (such as a frequency domain resource or a spectrum resource) used by a cell managed by the network element in the NG-RAN. The cell may be a macro cell, a hyper cell, or a small cell. Small cells herein may include a metrocell, a microcell, a picocell, a femtocell, and the like. These small cells feature a small coverage area and low transmit power, and are applicable to providing a high-rate data transmission service.

It should be noted that based on a RAN device on which a CU is separated from a DU, the CU and the DU may be physically separated or deployed together. A plurality of DUs may be connected to one CU. One DU may be connected to a plurality of CUs. The CU and the DU may be connected through a standard interface (such as an F1 interface). Respective functions of the CU and the DU may be classified based on a protocol layer of a wireless network. For example, functions of a radio resource control (RRC) layer, a service data adaptation protocol (SDAP) layer, and a packet data convergence protocol (PDCP) layer are set on the CU, while functions of a radio link control (RLC) layer, a media access control (MAC) layer, and a physical (PHY) layer are set on the DU. It should be understood that classifying processing functions of the CU and the DU based on the protocol layer is merely an example. The respective functions of the CU and the DU may be alternatively classified in another manner. For example, some processing functions of the protocol layer may be classified for the CU or the DU. In a possible implementation, some functions of the RLC layer and a function of a protocol layer above the RLC layer are set on the CU, and a remaining function of the RLC layer and a function of a protocol layer below the RLC layer are set on the DU. In another possible implementation, the functions of the CU or the DU may be alternatively classified based on a service type or according to another system requirement. For example, the classification is performed based on a latency: a function whose processing time needs to meet a latency requirement is set on the DU, and a function whose processing time does not need to meet the latency requirement is set on the CU. In still another possible implementation, the CU may alternatively have one or more functions of a core network. One or more CUs may be disposed together or separately. For example, the CUs may be disposed on a network side for centralized management. The DU may have a plurality of radio frequency functions, and the radio frequency functions may be remotely set. The functions of the CU may be implemented by one entity or may be implemented by different entities. For example, the functions of the CU may be further classified to separate a control plane (CP) from a user plane (UP), that is, a control plane of the CU (CU-CP) and a user plane of the CU (CU-UP). For example, the CU-CP and the CU-UP may be implemented by different functional entities. The CU-CP and the CU-UP may be coupled to the DU to jointly implement functions of the RAN device. For example, the CU-CP is responsible for the control plane functions, and mainly includes an RRC and a PDCP-C. The PDCP-C is mainly responsible for data encryption and decryption, integrity protection, data transmission, and the like on the control plane. The CU-UP is responsible for the user plane functions, and mainly includes an SDAP and a PDCP-U.

The SDAP is mainly responsible for processing data of the core network and mapping a data stream to a radio bearer. The PDCP-U is mainly responsible for encryption and decryption, integrity protection, header compression, serial number maintenance, data transmission, and the like on a data plane. The CU-CP and the CU-UP may be connected through a standard interface (such as an E1 interface). The CU-CP connects to the core network through the NG interface on behalf of the gNB, and connects to the DU through F1-C. The CU-UP connects to the DU through F1-U. Optionally, the CU-UP further includes the PDCP-C.

The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in the WLAN, or may be a cellular phone, a cordless phone, a session initiation protocol (SIP) phone, a wireless local loop (WLL) station, a personal digital assistant (PDA) device, a handheld device having a wireless communication function, a relay device, a computing device or another processing device connected to a wireless modem, a vehicle-mounted device, a wearable device, a terminal device in a next generation communications system such as the 5G network, a terminal device in the future evolved PLMN, or the like. By way of example but not limitation, in this embodiment of this application, the terminal device may be alternatively a wearable device. The wearable device may also be referred to as a wearable intelligent device, and is a collective name of wearable devices, such as glasses, gloves, watches, clothes, and shoes, obtained by applying a wearable technology to intelligent design and development of daily wear. The wearable device is a portable device that is directly worn or integrated into clothes or an accessory of a user. The wearable device not only is a hardware device, but also implements a strong function through software support, data exchange, and cloud exchange. Generic wearable intelligent devices include a large full-featured wearable device, such as a smartwatch or smart glasses, capable of implementing all or some functions without relying on a smartphone; and a wearable device, such as various smart bands performing vital sign monitoring and smart jewelry, that concentrates only on a particular type of application function and needs to be used together with another device such as a smartphone.

Different from a protocol stack of an LTE system, an SDAP layer is added above a packet data convergence protocol (PDCP) layer for an NG-RAN device and a terminal device in a 5G system. One PDU session corresponds to one SDAP entity. The SDAP layer is responsible for mapping between a QoS flow and a DRB, and may add a QFI corresponding to the QoS flow to a header of a data packet in the QoS flow. The NG-RAN may configure, by using an RRC message, whether an uplink data packet or a downlink data packet on a DRB of the terminal device carries an SDAP header. When it is configured that the downlink data packet needs to carry the SDAP header, the SDAP layer of the RAN device needs to add a QFI to each downlink data packet. When it is configured that the uplink data packet needs to carry the SDAP header, the SDAP layer of the terminal device needs to add a QFI to each uplink data packet. FIG. 2 shows a format of an SDAP protocol data unit, where an RDI field, an RQI field, and a QFI field form a header of the SDAP protocol data unit. The RDI field is used to indicate whether an AS layer executes reflective mapping. The RQI field is used to indicate whether a NAS layer executes reflective QoS. The AS layer is mainly responsible for a mapping relationship between a QoS flow and a data radio bearer (DRB). For downlink data, the NG-RAN implements the mapping relationship between a QoS flow and a DRB by using a mapping rule of the AS layer. To be specific, the NG-RAN configures the mapping relationship between a QoS flow and a DRB, and provides a QoS service for the QoS flow by using the DRB on an air interface. For uplink data, the NG-RAN notifies the terminal device of a mapping relationship between a corresponding QoS flow and a DRB. One or more QoS flows may be mapped to one DRB. Same forwarding processing is performed on data packets on a same DRB. The NG-RAN may configure a mapping relationship between uplink transmission of a QoS flow and a DRB for the terminal device by using RRC signaling or through reflective mapping. The reflective mapping means that the terminal device maps, by detecting a QFI carried in a downlink data packet, an uplink data packet in a QoS flow having a same QFI to a DRB that carries the downlink data packet. In other words, the uplink data packet and the downlink data packet are carried on a same DRB. For example, a downlink data packet in a QoS flow is mapped to a first DRB. If the AS layer uses the reflective mapping, an uplink data packet in the QoS flow is also mapped to the first DRB.

The inventors find that a quantity of QoS flows that may be included in different PDU sessions varies greatly. Therefore, QFIs of different lengths may be used for different PDU sessions. Different RAN devices have different QFI support capabilities because of their respective different capabilities or different implemented protocol versions. For example, some RAN devices support only short QFIs (that is, a QFI value range is relatively small), while other RAN devices support short QFIs and long QFIs (that is, a QFI value range is relatively large). In this case, when the terminal device is handed over from one RAN device to another RAN device, after the terminal device is handed over, service data cannot be transmitted based on a QFI used by the terminal device on the source RAN device because different RAN devices have different QFI support capabilities. Otherwise, the target RAN device may not be able to identify the corresponding QFI, and the service data is lost. Therefore, an embodiment of this application provides a technical solution for handing over a terminal device between RAN devices that have different QFI support capabilities.

When data of a QoS flow in a PDU session of a terminal device is transmitted on a GPRS (General Packet Radio Services) tunneling protocol-user plane (GTP-U) between different RAN devices and a GTP-U between a RAN device and a CN device, a PDU session container is added before the data of the QoS flow to identify the QoS flow. FIG. 3 shows a format of a PDU session container, used to indicate a QoS flow whose QFI is 6 bits in length. When a RAN device that supports a QFI in a larger range performs data transmission with another RAN device or a CN device, the format of the PDU session container changes, for example, a QFI marked by more bits is used. FIG. 4 shows a format of an enhanced PDU session container. In the format, a QFI is 14 bits in length. It should be understood that the enhanced PDU session container shown in FIG. 4 is merely an example, and there may be another manner of enhancing the format shown in FIG. 3 to identify a QFI whose length is greater than 6 bits. Details are not described herein in this specification.

When the terminal device establishes communication with a network, the terminal device may report, to the CN device by using NAS signaling, a capability of the terminal device to support QFIs of different lengths. The terminal device may further report, to a RAN device by using AS signaling, the capability of the terminal device to support QFIs of different lengths. The CN device may send, to the RAN device, the capability of the terminal device to support QFIs of different lengths, where the capability is obtained by the CN device. The RAN device may also send, to the CN device, the capability of the terminal device to support QFIs of different lengths, where the capability is obtained by the RAN device. The RAN device may further report, to the CN device, a capability of the RAN device to support QFIs of different lengths, for example, by adding a corresponding indication to an NG setup request message, a RAN configuration update message, an AMF configuration update acknowledge message, or an NG reset message. The RAN device may report a capability, of the RAN device, that does not support a longer QFI (for example, does not support a QFI whose length exceeds 6 bits) to the CN device, for example, by adding a corresponding indication to a cause field in an AMF configuration update failure/error indication message. The CN device may further notify the RAN device of a capability of the CN device to support QFIs of different lengths, for example, by adding a corresponding indication to an NG setup response message, a RAN configuration update acknowledge message, an AMF configuration update message, or an NG reset message. The CN device may notify the RAN device of a capability, of the CN device, that does not support a longer QFI (for example, does not support a QFI whose length exceeds 6 bits), for example, by adding a corresponding indication to a cause field in an NG setup failure (NG setup failure) message or a RAN configuration update failure/error indication message. In this way, the CN device learns the capability of the RAN device to support QFIs of different lengths and the capability of the terminal device to support QFIs of different lengths, to determine a length of a QFI used when a PDU session is set up or modified for the terminal device. According to the foregoing steps, a length of a QFI used when data is transmitted between the terminal device and the RAN device, and between the RAN device and the CN device is determined. In an actual network, because different RAN devices have different capabilities or implement different protocol versions, some RAN devices may support only short QFIs (which are, for example, 6 bits in length), and some RAN devices may support longer QFIs (which are, for example, 10 bits in length). In this case, when the terminal device is handed over between different RAN devices, the network needs to adapt to QFI capabilities of the different RAN devices.

Embodiment 1

FIG. 5 is a schematic flowchart of a terminal device handover method according to an embodiment of this application. It should be understood that FIG. 5 is a schematic flowchart of a communication method according to this embodiment of this application, and shows detailed communication steps or operations of the method. However, these steps or operations are merely examples. Other operations or variations of the operations in FIG. 5 may be further performed in this embodiment of this application. In addition, the steps in FIG. 5 may be separately performed in a sequence different from that shown in FIG. 5, and not all the operations in FIG. 5 may be necessarily performed. The method 500 is applicable to a scenario in which a QFI support capability of a source RAN device from which a terminal device is handed over is higher than a QFI support capability of a target RAN device. The procedure includes the following steps.

501. The source RAN device sends a handover request to the target RAN device.

The handover request includes information about a QFI length configured by the source RAN device for the terminal device. The information about the QFI length may be specific to a PDU session, or may be specific to a DRB. It should be understood that when the terminal device has a plurality of DRBs, the handover request includes information about a QFI length of each DRB. When the terminal device has a plurality of PDU sessions, the handover request includes information about a QFI length of each PDU session. For a PDU session or a DRB, the handover request further includes a QFI and a QoS parameter of one or more QoS flows in the PDU session or on the DRB. It should be noted that, when the source RAN device establishes communication with the terminal device, the source RAN device sends, to the terminal device, information about a QFI length of each PDU session or each DRB for communication with the terminal device. In this step, the source RAN device sends the information about the QFI length of each PDU session or each DRB to the target RAN device.

For a PDU session, in a possible implementation, the source RAN device sends, to the target RAN device, information about a QFI length used for the PDU session. In this case, a same QFI length is used for all QoS flows in the PDU session. For example, a PDU session includes three QoS flows, where each of the three QoS flows is identified by using a QFI that is 6 bits in length. In another possible implementation, the source RAN device sends, to the target RAN device, information about a plurality of QFI lengths used for the PDU session. In this case, different QFI lengths may be used for different QoS flows in the PDU session. For example, a PDU session includes three QoS flows, where a first QoS flow may be identified by using a QFI that is 6 bits in length, a second QoS flow may be identified by using a QFI that is 8 bits in length, and a third QoS flow may be identified by using a QFI that is 10 bits in length. Optionally, each of the first QoS flow and the second QoS flow may be identified by using a QFI that is 6 bits in length, and the third QoS flow may be identified by using a QFI that is 10 bits in length. In addition, information that is about one QFI length and that is sent by the source RAN device to the target RAN device may be specific to all QoS flows on a DRB.

In this step, the information about the QFI length may indicate the QFI length in a plurality of forms.

In a possible implementation, the information about the QFI length may be a length value of a QFI. For example, information about a QFI length is a length value of the QFI, such as 6 bits, 8 bits, or 10 bits.

In another possible implementation, the information about the QFI length may be a value range of a QFI. For example, information about a QFI length is a value range of the QFI, such as 0-63 (a QFI length corresponding to the value range is 6 bits), 0-255 (a QFI length corresponding to the value range is 8 bits), or 0-1023 (a QFI length corresponding to the value range is 10 bits).

In still another possible implementation, the information about the QFI length may be a length class of a QFI. For example, information about a QFI length is a length class of the QFI, such as a long QFI or a short QFI. In this implementation, a standard specifies or an operator defines different QFI lengths, such as 6 bits and 10 bits, that can be used by a network side and the terminal device. In addition, both the network side and the terminal device obtain the information before a PDU session is set up. In this case, if the information that is about the QFI length and that is sent by the source RAN device to the target RAN device is the short QFI, it indicates that a QFI length used by the source RAN device is 6 bits. If the information that is about the QFI length and that is sent by the source RAN device to the target RAN device is the long QFI, it indicates that a QFI length used by the source RAN device is 10 bits. Further, the source RAN device may perform indication by using a 1-bit field, for example, set a bit value of the field to "0" to indicate that the short QFI is used, or set a bit value of the field to "1" to indicate that the long QFI is used. There may be a plurality of QFI length classes, such as a long QFI, a medium QFI, and a short QFI. In this implementation, a standard specifies or an operator defines that a network side and the terminal device can use three or more different lengths, such as 6 bits, 8 bits, and 10 bits. In addition, both the network side and the terminal device obtain the information before a PDU session is set up. In this case, if the information that is about the QFI length and that is sent by the source RAN device to the target RAN device is the short QFI, it indicates that a QFI length used by the source RAN device is 6 bits. If the information that is about the QFI length and that is sent by the source RAN device to the target RAN device is the medium QFI, it indicates that a QFI length used by the source RAN device is 8 bits. If the information that is about the QFI length and that is sent by the source RAN device to the target RAN device is the long QFI, it indicates that a QFI length used by the source RAN device is 10 bits. Further, the source RAN device may perform indication by using a 2-bit field, for example, set a bit value of the field to "00" to indicate that the short QFI is used, set a bit value of the field to "01" to indicate that the medium QFI is used, or set a bit value of the field to "10" to indicate that the long QFI is used. The information about the QFI length may be alternatively indicated by using another implicit method, for example, indirectly indicated by using other information. For example, the source RAN device notifies the target RAN device of information about an SDAP header length configured by the source RAN device for the terminal device. Different QFI lengths are implicitly indicated when the SDAP header length falls into different ranges. For example, when the SDAP header length is greater than 1 byte, it indicates that the QFI length is 8 bits. When the SDAP header length is less than or equal to 1 byte, it indicates that the QFI length is 6 bits.

It should be understood that, in this step, the information that is about the QFI length and that is included in the handover request is applied to both uplink transmission of a QoS flow and downlink transmission of the QoS flow. In other words, QFIs of a same length are used for the uplink transmission and the downlink transmission of the QoS flow. Optionally, the handover request message may further include information about a QFI length for the uplink transmission of the QoS flow and information about a QFI length for the downlink transmission of the QoS flow. In a possible implementation, for a PDU session, the handover request message includes information about a QFI length for uplink transmission of all QoS flows in the PDU session and information about a QFI length for downlink transmission of all the QoS flows in the PDU session. In another possible implementation, for a PDU session, the handover request message includes information about a QFI length for uplink transmission of one or more QoS flows in the PDU session and information about a QFI length for downlink transmission of the one or more QoS flows in the PDU session.

Further, the handover request may include a QFI support capability of the terminal device, for example, information about a QFI length used by the terminal device.

502. The target RAN device performs admission control.

In this step, the target RAN device performs admission control on the terminal device based on a capability of the target RAN device to support a service that is communicated by the terminal device on the source RAN device, a resource condition of the target RAN device, the information that is about the QFI length and that is sent by the source RAN device, and the QFI support capability of the target RAN device. Further, the target RAN device may perform admission control on the terminal device based on the QFI support capability of the terminal device. When the QFI support capability of the source RAN device is higher than the QFI support capability of the target RAN device, the target RAN device may reject access of a QoS flow, of the terminal device, that goes beyond a support capability range of the target RAN device. Optionally, the target RAN device alternatively rejects access of a QoS flow of the terminal device based on another criterion. For example, a QFI range supported by the source RAN device is 0-255, and a QFI range supported by the target RAN device is 0-63. It indicates that the QFI support capability of the target RAN device is lower than the QFI support capability of the source RAN device. In this case, the target RAN device may perform, in consideration of another factor, admission control on a QoS flow whose QFI value ranges from 0 to 63 on the source RAN device, and directly reject a QoS flow whose QFI value ranges from 64 to 255. It should be understood that when the QFI support capability of the target RAN device is lower than the QFI support capability of the source RAN device, the target RAN device can still identify a QFI sent by the source RAN device. For example, the target RAN device can support only a QFI ranging from 0 to 63 (that is, 6 bits in length), and a QFI added by the source RAN device to the handover request ranges from 0 to 255 (that is, 8 bits in length). In this case, the target RAN device can still identify a QFI ranging from 64 to 255, but the target RAN device does not support a QFI that is 8 bits in length.

503. The target RAN device sends a handover request acknowledgement to the source RAN device.

The handover request acknowledgement includes information about a QFI length configured by the target RAN device for the terminal device. It should be understood that the target RAN device configures the information about the QFI length for the terminal device based on the QFI support capability of the target RAN device, and the target RAN device may further configure the information about the QFI length for the terminal device based on the QFI support capability of the terminal device. The information about the QFI length may be specific to a PDU session, or may be specific to a DRB. It should be understood that when the terminal device has a plurality of DRBs, the handover request includes information about a QFI length of each DRB. When the terminal device has a plurality of PDU sessions, the handover request includes information about a QFI length of each PDU session. Similarly, the information about the QFI length may be explicitly indicated, or may be implicitly indicated. In addition, for a PDU session, the handover request acknowledgement further includes a QFI of one or more QoS flows that are in the PDU session and that are accepted by the target RAN device after the admission control. Optionally, the handover request acknowledgement further includes a QFI of one or more QoS flows rejected by the target RAN device after the admission control. The rejected QoS flow may be rejected by the target RAN device because of insufficient resources of the target RAN device, or may be rejected by the target RAN device because the target RAN device does not support the QFI of the QoS flow.

The target RAN device allocates tunnel information for each successfully accepted PDU session, for data transfer. The handover request acknowledgement may further include the tunnel information for data transfer. The tunnel information may include PDU session-level tunnel information, and may also include DRB-level tunnel information. Alternatively, the tunnel information includes only PDU session-level tunnel information. The tunnel information includes a transport layer address and a tunnel port identifier.

504. The source RAN device sends a handover command to the terminal device.

The handover command includes the information about the QFI length configured by the target RAN device for the terminal device. The information about the QFI length may be specific to a PDU session, or may be specific to a DRB. It should be understood that when the terminal device has a plurality of DRBs, the handover request includes information about a QFI length of each DRB. When the terminal device has a plurality of PDU sessions, the handover request includes information about a QFI length of each PDU session. In addition, the handover command further includes a QFI of one or more QoS flows accepted by the target RAN device after the admission control.

505. The source RAN device transfers data to the target RAN device.

In this step, in a possible implementation, the source RAN device directly transfers the data to the target RAN device. In another possible implementation, the source RAN device first transfers the data to a CN device, and then the CN device transfers the data to the target RAN device. For data transferred in a PDU session tunnel, a GTP-U header needs to include the information about the QFI length, and a QFI length of a QoS flow of the terminal device on the source RAN device is greater than a QFI length supported by the target RAN device. Therefore, if the source RAN device uses a long QFI format for transmission, the target RAN device cannot perform identification. Therefore, the source RAN device needs to use a QFI length supported by both the source RAN device and the target RAN device for sending. Specifically, that the source RAN device performs QoS flow adaptation means that the source RAN device adapts a QFI of one or more QoS flows of the terminal device on the source RAN device to a QFI supported by the target RAN device, and then transfers the data. In other words, the source RAN device transfers the data to the target RAN device after adapting the QFI length configured by the source RAN device for the terminal device to the QFI length configured by the target RAN device for the terminal device.

506. The terminal device accesses the target RAN device.

In this step, the terminal device accesses the target RAN device, and establishes communication with the target RAN device to implement data transmission.

507. The target RAN device sends a path transfer request to the CN device.

508. The CN device sends a path transfer acknowledgement to the target RAN device.

Before step 508, the CN device may send an end marker to the source RAN device to indicate that the CN device subsequently no longer sends data to the source RAN device. The source RAN device may further forward the end marker to the target RAN device.

509. The target RAN device sends a terminal device context release instruction to the source RAN device.

According to the foregoing steps in this embodiment, the target RAN device performs corresponding admission control based on the QFI support capability of the source RAN device and the QFI support capability of the target RAN device. In this way, after the terminal device is handed over, service data can be transmitted by using a QFI supported by the target RAN device. This ensures continuity of service data transmission.

Embodiment 2

Figure 6:
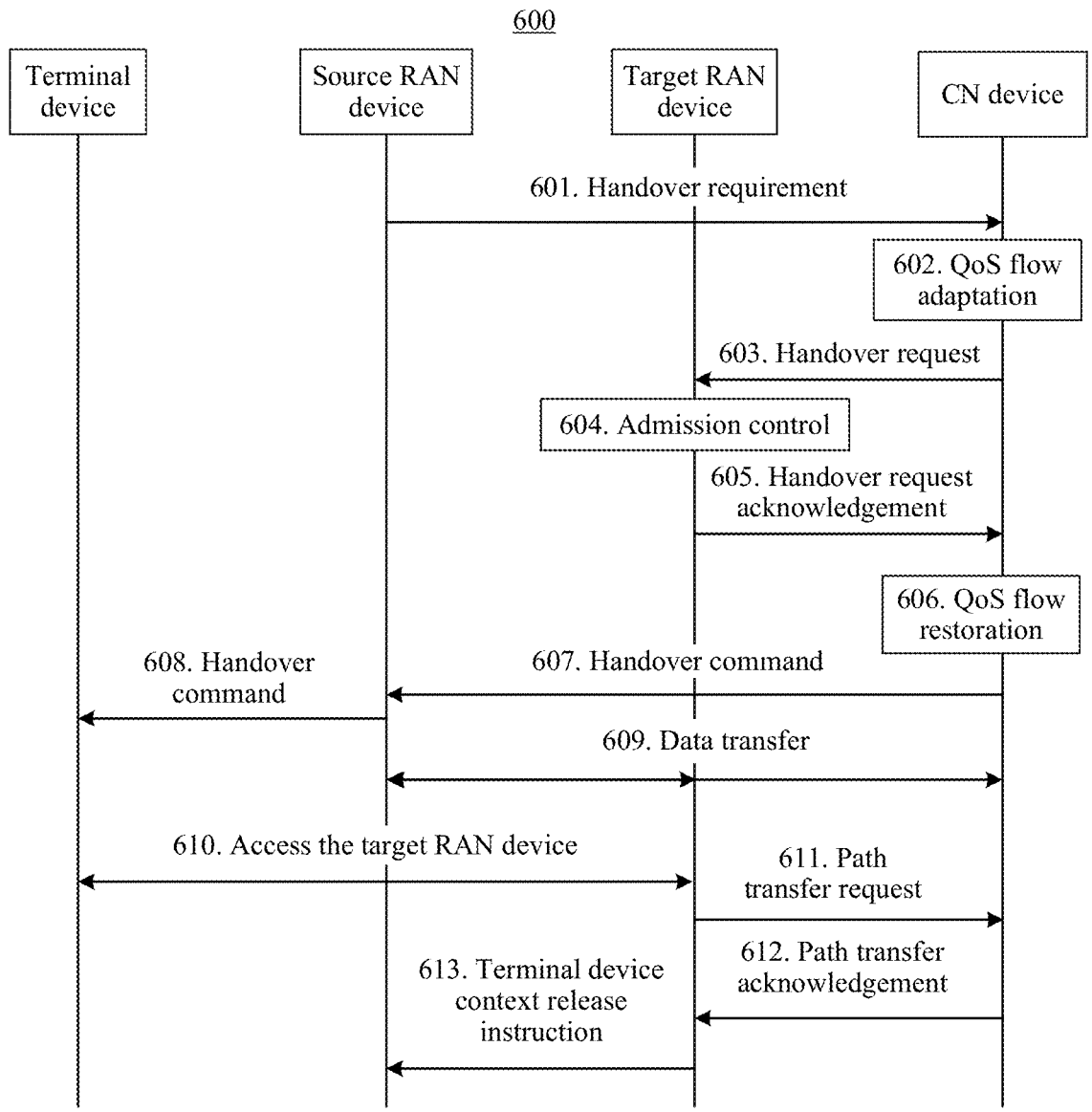
FIG. 6 is a schematic diagram of another handover procedure according to an embodiment of this application.

FIG. 6 is a schematic flowchart of another terminal device handover method according to an embodiment of this application. It should be understood that FIG. 6 is a schematic flowchart of a communication method according to this embodiment of this application, and shows detailed communication steps or operations of the method. However, these steps or operations are merely examples. Other operations or variations of the operations in FIG. 6 may be further performed in this embodiment of this application. In addition, the steps in FIG. 6 may be separately performed in a sequence different from that shown in FIG. 6, and not all the operations in FIG. 6 may be necessarily performed. The method 600 is applicable to a scenario in which a QFI support capability of a source RAN device from which a terminal device is handed over is higher than a QFI support capability of a target RAN device. The procedure includes the following steps.

601. The source RAN device sends a handover requirement to a CN device.

The handover requirement includes an identifier of the target RAN device.

602. The CN device performs QoS flow adaptation.

In this step, the CN device receives the handover requirement sent by the source RAN device, and queries the QFI support capability of the target RAN device based on the identifier of the target RAN device in the handover requirement. QoS flow information sent by the CN device to the target RAN device is adapted based on the QFI support capability of the target RAN device. Specifically, that the CN device performs QoS flow adaptation means that the CN device adapts a QFI of one or more QoS flows of the terminal device on the source RAN device to a QFI supported by the target RAN device. For example, if a QFI value range supported by the source RAN device is 0-255, and a QFI value range supported by the target RAN device is 0-63, a QFI that corresponds to a QoS flow and that is sent by the CN device to the target RAN device ranges from 0 to 63. The CN device needs to perform QoS flow adaptation. Specifically, the CN device may adapt a QoS flow between the source RAN device and the target RAN device in different manners. In a possible implementation, the CN device sends only a QFI and a QoS parameter of a QoS flow in a range of the QFI support capability of the target RAN device to the target RAN device for admission control. In another possible implementation, the CN device aggregates one or more QoS flows of the terminal device served by the source RAN device into one QoS flow with a new QFI. For example, if the CN device aggregates three QoS flows of the source RAN device into a new QoS flow, the original three QoS flows are indicated by three QFIs, while only one QFI is required for indicating the new QoS flow. This reduces a quantity of QoS flows. It should be understood that, in this manner of QoS flow aggregation, a range of a QFI that is used to indicate a QoS flow of the terminal device served by the source RAN device can be narrowed down. For example, a QFI of a QoS flow of the terminal device served by the source RAN device ranges from 0 to 255. After the QoS flow aggregation, a quantity of generated QoS flows can be greatly reduced, so that a QFI used to indicate an aggregated QoS flow ranges from 0 to 63.

For example, the source RAN device can support a QFI ranging from 0 to 255, the target RAN device can support a QFI ranging from 0 to 63, and therefore the QFI support capability of the source RAN device is higher than the QFI support capability of the target RAN device. In a possible implementation, the CN device adapts a QFI corresponding to a QoS flow of the terminal device from a range of 0-255 to a range of 0-63, for example, adapts a QFI whose value is "00110101" to a QFI whose value is "110101", so that the QFI value range meets the QFI support capability of the target RAN device. Because the target RAN device can support only a QFI that is 6 bits in length, the CN device may directly reject a QoS flow, whose QFI value exceeds 63, of the terminal device on the source RAN device, and does not send the QoS flow to the target RAN device for admission control. For example, the CN device directly rejects a QoS flow whose QFI value is "01001011", because values of two most significant bits of the QFI are not 0, which exceeds a length of the QFI supported by the target RAN device. In another possible implementation, the CN device aggregates and adapts a plurality of QoS flows of the terminal device on the source RAN device to a new QoS flow on the target RAN device. For example, the CN device aggregates three QoS flows whose values are "00101101", "01001110", and "10001101" of the terminal device on the source RAN device into one QoS flow on the target RAN device, and sets a QFI value of the QoS flow to "100111".

603. The CN device sends a handover request to the target RAN device.

The handover request includes a QFI and a QoS parameter of one or more QoS flows obtained after the CN device performs QoS flow adaptation.

604. The target RAN device performs admission control.

In this step, the target RAN device performs admission control on a QoS flow based on a QFI and a QoS parameter of the corresponding QoS flow that are received from the CN device. For example, the target RAN device performs admission control based on a capability of the target RAN device to support a service of the terminal device and a resource condition of the target RAN device.

605. The target RAN device sends a handover request acknowledgement to the CN device.

In this step, the target RAN device sends a QFI of a QoS flow that passes the admission control to the CN device. Optionally, the handover request acknowledgement includes information about a tunnel allocated by the target RAN device to each accepted PDU session. The information about the tunnel is used for data transmission between the target RAN device and the CN device. The information about the tunnel may be at a PDU session level or a DRB level. In addition, because of different QFI support capabilities, when the target RAN device cannot identify a QFI length of the source RAN device, the target RAN device may perform full configuration, that is, reconfigure all RRC resources (for example, radio bearer configuration) for the terminal device without following a corresponding RRC configuration on the source RAN device.

606. The CN device performs QoS flow restoration.

In this step, the CN device performs QoS flow restoration based on a result of the admission control performed by the target RAN device. Specifically, that the CN device performs QoS flow restoration means that the CN device restores a QFI of one or more QoS flows of the terminal device that are adapted to the target RAN device to a QFI of the one or more QoS flows of the terminal device on the source RAN device. For example, if a QFI value range supported by the source RAN device is 0-255, and a QFI value range supported by the target RAN device is 0-63, the CN device performs QoS flow adaptation in step 602. For example, a QFI whose value is "00110101" of the terminal device on the source RAN device is adapted to a QFI whose value is "110101" on the target RAN device. After admission control is performed in step 604, the target RAN device accepts a QoS flow corresponding to the QFI. In this step, the CN device restores the QFI whose value is "110101" of the terminal device on the target RAN device to the QFI whose value is "00110101" of the terminal device on the source RAN device.

607. The CN device sends a handover command to the source RAN device.

The handover command includes a QoS flow that is accepted by the target RAN device and that is communicated between the source RAN device and the terminal device. Optionally, the handover command further includes an RRC resource allocated by the target RAN device to the terminal device. The handover command may further include a correspondence between a QoS flow of the terminal device on the source RAN device and a QoS flow that is obtained after the adaptation and that is on the target RAN device.

608. The source RAN device sends a handover command to the terminal device.

The handover command includes the RRC resource allocated by the target RAN device to the terminal device.

609. The source RAN device transfers data to the target RAN device.

In a possible implementation, the source RAN device directly forwards the data to the target RAN device. In this case, the source RAN device transfers the data in a PDU session tunnel, where a QFI length supported by both the source RAN device and the target RAN device needs to be used for QFI information carried in a GTP-U header. In addition, the source RAN device may map a QFI of the source RAN device to a QFI of the target RAN device based on a correspondence that is between a QFI of the target RAN device and a QFI of the source RAN device and that is sent by the CN device, and then forward, to the target RAN device, data of a QoS flow corresponding to the QFI. In other words, the source RAN device transfers the data to the target RAN device after adapting a QFI length configured by the source RAN device for the terminal device to a QFI length configured by the target RAN device for the terminal device.

In another possible implementation, the source RAN device forwards the data to the CN device, and then the CN device forwards the data to the target RAN device. In this case, the source RAN device may transfer the data to the CN device by using a QFI length supported by the source RAN device. The CN device transfers the data to the target RAN device by using an adaptation method.

610. The terminal device accesses the target RAN device.

611. The target RAN device sends a path transfer request to the CN device.

612. The CN device sends a path transfer acknowledgement to the target RAN device.

613. The target RAN device sends a terminal device context release instruction to the source RAN device.

Steps 610 to 613 are similar to steps 506 to 509 in the foregoing embodiment, and details are not described herein again.

In addition, before step 612, the CN device may send an end marker to the source RAN device to indicate that the CN device subsequently no longer sends data to the source RAN device. The source RAN device may further forward the end marker to the target RAN device.

According to the foregoing steps in this embodiment, the CN device performs corresponding adaptation on the QoS flow based on the QFI support capability of the source RAN device and the QFI support capability of the target RAN device. In this way, after the terminal device is handed over, service data can be transmitted by using a QFI supported by the target RAN device. This ensures continuity of service data transmission.

Embodiment 3

In a scenario in which a QFI support capability of a source RAN device is higher than a QFI support capability of a target RAN device, in addition to the handover methods illustrated in FIG. 5 and FIG. 6, the source RAN device may actively make a QFI length used by the source RAN device be equal to a QFI length supported by the target RAN device, and then initiate handover. Specifically, before sending a handover request or a handover requirement, the source RAN device obtains the QFI support capability of the target RAN device. The source RAN device adapts a QoS flow of the terminal device between different QFI capabilities, and adds, to the to-be-sent handover request or handover requirement, a QFI of the QoS flow obtained after the adaptation. For example, the source RAN device can support a QFI ranging from 0 to 255, the target RAN device can support a QFI ranging from 0 to 63, and therefore the QFI support capability of the source RAN device is higher than the QFI support capability of the target RAN device. The source RAN device obtains the QFI support capability of the target RAN device when the source RAN device establishes an Xn interface with the target RAN device, or in another case. When the terminal device needs to be handed over, the source RAN device performs QoS flow adaptation, that is, adapts a QFI corresponding to the QoS flow of the terminal device from a range of 0-255 to a range of 0-63, for example, adapts a QFI whose value is "00110101" to a QFI whose value is "110101", so that a QFI value range meets the QFI support capability of the target RAN device. Then, when sending the handover request to the target RAN device or sending the handover requirement to a CN device, the source RAN device adds the QFI obtained after the adaptation to the handover request or the handover requirement. For example, for a QoS flow indicated by the QFI whose value is "00110101" before the adaptation, the source RAN device sends the QFI "110101" that is obtained after adaptation on the QoS flow and a QoS parameter of the QoS flow to the target RAN device or the CN device. In this manner, a terminal device handover procedure is similar to a handover procedure in the prior art, and details are not described herein.

According to the foregoing steps in this embodiment, the source RAN device actively performs capability adaptation based on the QFI support capability of the source RAN device and the QFI support capability of the target RAN device. In this way, after the terminal device is handed over, service data can be transmitted by using a QFI supported by the target RAN device. This ensures continuity of service data transmission.

Embodiment 4

In a scenario in which a QFI support capability of a source RAN device is lower than a QFI support capability of a target RAN device, a terminal device handover procedure is also similar to a handover procedure in the prior art. A main difference lies in that the target RAN device learns, from a handover request received from the source RAN device, that the QFI support capability of the source RAN device is lower than the QFI support capability of the target RAN device. In this case, the target RAN device actively makes a QFI length used by the target RAN device be equal to a QFI length supported by the source RAN device, that is, uses a same QFI as the source RAN device to indicate a QoS flow. For example, the source RAN device can support a QFI ranging from 0 to 63, the target RAN device can support a QFI ranging from 0 to 255, and therefore the QFI support capability of the source RAN device is lower than the QFI support capability of the target RAN device. After the handover request received by the target RAN device from the source RAN device includes a QFI that is 6 bits in length, the target RAN device still uses the QFI that is 6 bits in length, instead of converting the QFI to a QFI that is 8 bits in length by using the higher QFI support capability of the target RAN device, and changing a value of the QFI. Optionally, the target RAN device needs to notify a CN device of information about a QFI length used by the target RAN device for the terminal device, by using, for example, a path transfer request. In this manner, adaptation between QFIs of different lengths is no longer required in the handover procedure, and devices in a network can perform operations according to an existing handover procedure.

According to the foregoing steps in this embodiment, the target RAN device actively performs capability adaptation based on the QFI support capability of the target RAN device and the QFI support capability of the target RAN device. In this way, after the terminal device is handed over, service data can be transmitted by using a QFI supported by the target RAN device. This ensures continuity of service data transmission.

Embodiment 5

In addition, when an existing terminal device is handed over between different RAN devices, a source RAN device adds, to a handover request message sent to a target RAN device, a mapping relationship that is between a QoS flow and a DRB and that is configured by the source RAN device for the terminal device. When reflective mapping is used at an AS layer, that is, uplink transmission of a QoS flow of the terminal device and downlink transmission of the QoS flow are mapped to a same DRB, the source RAN device only needs to send the mapping relationship that is between a QoS flow and a DRB and that is configured for the terminal device to the target RAN device. When reflective mapping is not used at an AS layer, uplink transmission of a QoS flow of the terminal device and downlink transmission of the QoS flow may be mapped to different DRBs. For example, the uplink transmission and the downlink transmission of the QoS flow have different QoS parameters. Therefore, an existing handover request message is no longer applicable to a non-reflective mapping scenario. In this embodiment of this application, a source RAN device separately sends, to a target RAN device, a mapping relationship that is between uplink transmission of a QoS flow and a DRB and that is configured for a terminal device and/or a mapping relationship that is between downlink transmission of the QoS flow and a DRB and that is configured for the terminal device. This ensures that after handover, the terminal device sequentially submits downlink data packets to an upper layer, and the target RAN device sequentially forwards uplink data packets to a CN device.

In a process in which the terminal device is handed over from the source RAN device to the target RAN device, in a possible implementation, the source RAN device adds, to a handover request message sent to the target RAN device, a mapping relationship between uplink/downlink transmission of a QoS flow and a DRB. The mapping relationship between uplink/downlink transmission of a QoS flow and a DRB is a mapping relationship that is between uplink transmission of a QoS flow and a DRB and that is configured by the source RAN device for the terminal device and/or a mapping relationship that is between downlink transmission of the QoS flow and a DRB and that is configured by the source RAN device for the terminal device. The mapping relationship between uplink/downlink transmission of a QoS flow and a DRB may be represented in an explicit manner, may be represented in a container manner, or may be represented in a combination of the two manners. For example, in the explicit representation manner, a list that is of mapping between a source DRB and a QoS flow and that is sent by the source RAN device to the target RAN device includes a QFI of one or more QoS flows and a DRB ID of a DRB to which downlink of the one or more QoS flows is mapped. In the container representation manner, the source RAN device indicates mapping between uplink transmission of one or more QoS flows and a DRB by using a DRB ID in handover preparation information in an RRC context sent by the source RAN device to the target RAN device and mappedQoS-FlowsToAdd in SDAP-config in the RRC context. In another possible implementation, the source RAN device adds, to a handover requirement message sent to the CN device, a mapping relationship between uplink/downlink transmission of a QoS flow and a DRB. Further, a handover request message sent by the CN device to the target RAN device includes the mapping relationship between uplink/downlink transmission of a QoS flow and a DRB.

In the process in which the terminal device is handed over from the source RAN device to the target RAN device, for downlink transmission, the source RAN device needs to forward, to the target RAN device, downlink data that is not correctly received by the terminal device in the downlink transmission, and the target RAN device re-transmits the downlink data to the terminal device. In a terminal device handover process, after the target RAN device obtains the mapping relationship that is between uplink/downlink transmission of a QoS flow and a DRB and that is configured by the source RAN device for the terminal device, the target RAN device may transmit the downlink data, forwarded by the source RAN device, to the terminal device on a DRB that has a same configuration as that used by the source RAN device. For new downlink data sent from the CN device, if the target RAN device changes the mapping relationship between the downlink transmission of the QoS flow and a DRB, the target RAN device sends the downlink data by using a new DRB; if the target RAN device uses a same mapping relationship as the source RAN device, the target RAN device transmits the downlink data on the DRB that has the same configuration as that used by the source RAN device. The target RAN device first transmits the data forwarded from the source RAN device, and then transmits the new downlink data received from a core network. If the target RAN device does not use the same mapping relationship as the source RAN device, the target RAN device transmits, on the new DRB, the new downlink data received from the CN device. In addition, the target RAN device may transmit the new downlink data received from the CN device to the terminal device after confirming that the terminal device correctly receives the downlink data transferred from the source RAN device. This ensures continuity of service data transmission, and ensures that the terminal device can submit received downlink data in-sequence to an upper layer (such as an application layer).

For uplink transmission, the source RAN device needs to forward, to the target RAN device, data that is received out-of-sequence in the uplink transmission. The terminal device needs to re-transmit, to the target RAN device, uplink data that is not correctly received by the source RAN device in the uplink transmission. The target RAN device sorts uplink data received from the source RAN device and from the terminal device, and then sends the sorted uplink data to the CN device. For the uplink data that is not correctly received by the source RAN device, the terminal device re-transmits the uplink data to the target RAN device on a DRB that has a same configuration as that used by the source RAN device. If the target RAN device changes the mapping relationship between the uplink transmission of the QoS flow and a DRB, the terminal device transmits an end marker on a source DRB to indicate that the terminal device no longer transmits uplink data on the source DRB, and the terminal device transmits the uplink data on a new DRB used by the target RAN device. For example, the end marker is an end marker control PDU at an SDAP layer of the terminal device. For a new uplink data packet at the upper layer (such as the application layer), if the target RAN device changes the mapping relationship between the uplink transmission of the QoS flow and a DRB, the terminal device transmits the new uplink data on the new DRB used by the target RAN device; if the target RAN device maintains mapping that is between uplink transmission and a DRB and that is configured by the source RAN device, the terminal device transmits the new uplink data on the source DRB. For the target RAN device, when the target RAN device changes the mapping relationship between the uplink transmission of the QoS flow and a DRB, the target RAN device starts to submit data that is of the QoS flow and that is received from the new DRB to the core network only after receiving the end marker sent by the terminal device. This ensures that service data is continuous and is sequentially submitted.

Optionally, the source RAN device configures a mapping relationship between uplink/downlink transmission of one or more QoS flows and a DRB for the terminal device before the terminal device is handed over. Further, the source RAN device notifies, by using air interface signaling, the terminal device of the mapping relationship between the uplink transmission of the one or more QoS flows and a DRB. It should be understood that these operations are not limited to be performed before the terminal device is handed over, and may be alternatively performed when the terminal device establishes communication with a RAN device, or when a serving RAN device configures a DRB.

According to the foregoing steps in this embodiment, when the uplink transmission and the downlink transmission of the QoS flow of the terminal device are mapped to different DRBs before the handover, uplink data and downlink data of the terminal device can be efficiently transmitted on proper DRBs after the handover. This ensures that service data is continuously transmitted and sequentially submitted.

Embodiment 6

When a QFI support capability of a source RAN device is higher than a QFI support capability of a target RAN device, in addition to the handover methods illustrated in FIG. 5 and FIG. 6, the source RAN device and the target RAN device obtain the QFI support capability of each other before the source RAN device sends a handover request or a handover requirement. For example, the QFI support capability of the source RAN device and the QFI support capability of the target RAN device are exchanged in an Xn interface establishment process. In this case, a specific handover procedure is consistent with that in FIG. 5 and FIG. 6. A main difference lies in that the source RAN device and the target RAN device do not need to exchange information about a corresponding QFI length in a handover process.

According to the foregoing steps in this embodiment, after a terminal device is handed over, service data can be transmitted by using a QFI supported by the target RAN device. This ensures continuity of service data transmission.

The foregoing describes the method embodiments of this application in detail with reference to the embodiments. The following describes apparatus embodiments of this application in detail with reference to FIG. 7 to FIG. 12. It should be understood that the apparatus embodiments and the method embodiments are corresponding to each other. For similar descriptions, refer to the method embodiments. It should be noted that the apparatus embodiments may be used in conjunction with the foregoing methods, or may be independently used.

Figure 7:
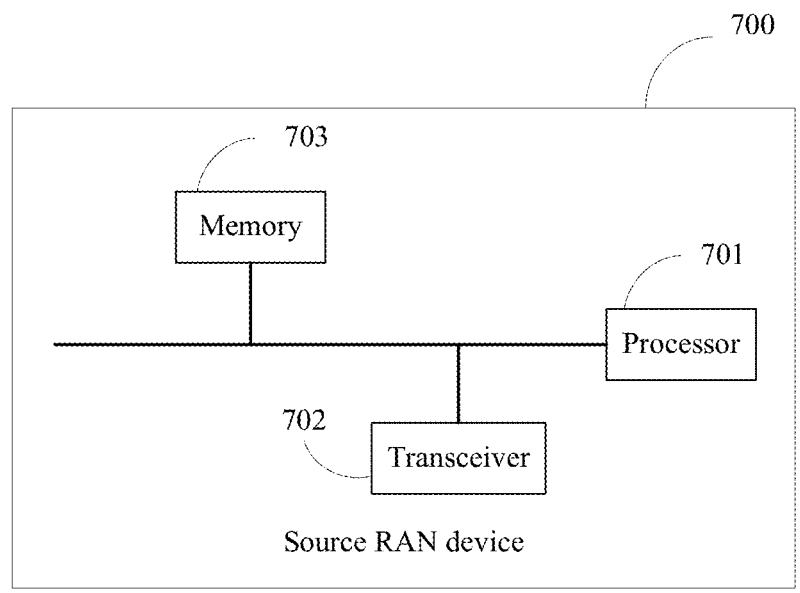
FIG. 7 is a schematic block diagram of a source RAN device according to an embodiment of this application.

FIG. 7 is a schematic block diagram of a communications apparatus 700 according to an embodiment of this application. The communications apparatus 700 may correspond to (for example, may be configured on or may be) the source RAN device described in the foregoing method embodiments. The communications apparatus 700 may include a processor 701 and a transceiver 702. The processor 701 and the transceiver 702 are communicatively connected. Optionally, the communications apparatus 700 further includes a memory 703. The memory 703 is communicatively connected to the processor 701. Optionally, the processor 701, the memory 703, and the transceiver 702 may be communicatively connected. The memory 703 may be configured to store an instruction. The processor 701 is configured to execute the instruction stored in the memory 703, to control the transceiver 702 to send information or a signal. The processor 701 and the transceiver 702 are separately configured to perform actions or processing processes performed by the source RAN device in the foregoing method embodiments. To avoid repetition, detailed descriptions thereof are omitted herein.

Figure 8:
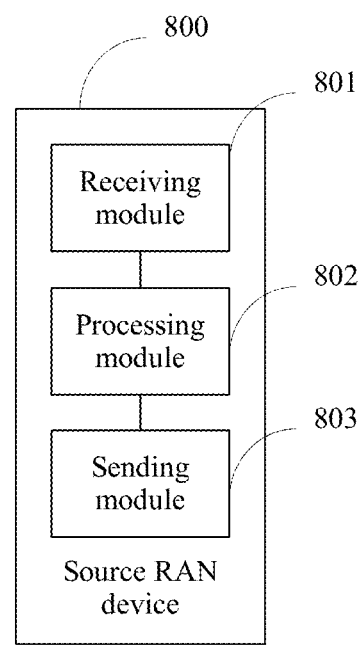
FIG. 8 is another schematic block diagram of a source RAN device according to an embodiment of this application.

FIG. 8 is a schematic block diagram of a communications apparatus 800 according to an embodiment of this application. The communications apparatus 800 may correspond to (for example, may be configured on or may be) the source RAN device described in the foregoing method embodiments. The communications apparatus 800 may include a receiving module 801, a processing module 802, and a sending module 803. The processing module 802 is separately communicatively connected to the receiving module 801 and the sending module 803. The modules or units in the communications apparatus 800 are separately configured to perform actions or processing processes performed by the source RAN device in the foregoing method embodiments. To avoid repetition, detailed descriptions thereof are omitted herein.

Figure 9:
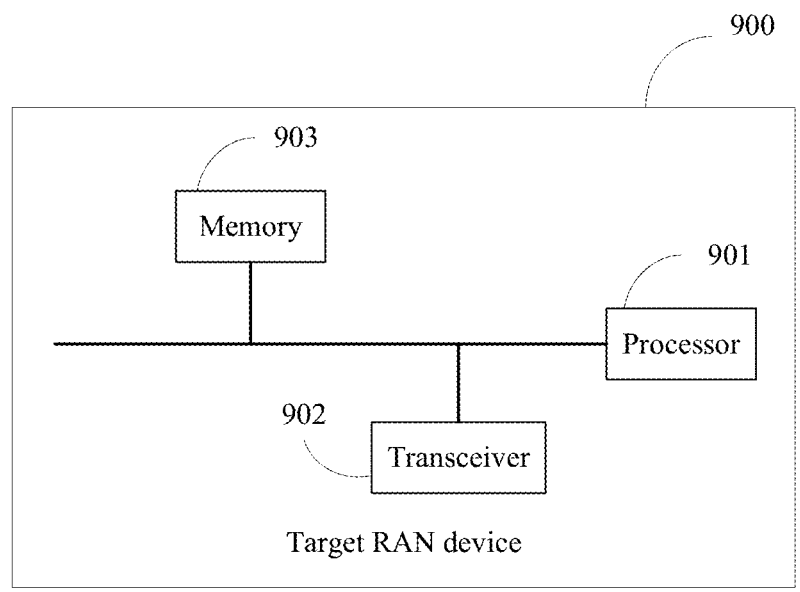
FIG. 9 is a schematic block diagram of a target RAN device according to an embodiment of this application.

FIG. 9 is a schematic block diagram of a communications apparatus 900 according to an embodiment of this application. The communications apparatus 900 may correspond to (for example, may be configured on or may be) the target RAN device described in the foregoing method embodiments. The communications apparatus 900 may include a processor 901 and a transceiver 902. The processor 901 and the transceiver 902 are communicatively connected. Optionally, the communications apparatus 900 further includes a memory 903. The memory 903 is communicatively connected to the processor 901. Optionally, the processor 901, the memory 903, and the transceiver 902 may be communicatively connected. The memory 903 may be configured to store an instruction. The processor 901 is configured to execute the instruction stored in the memory 903, to control the transceiver 902 to send information or a signal. The processor 901 and the transceiver 902 are separately configured to perform actions or processing processes performed by the target RAN device in the foregoing method embodiments. To avoid repetition, detailed descriptions thereof are omitted herein.

Figure 10:
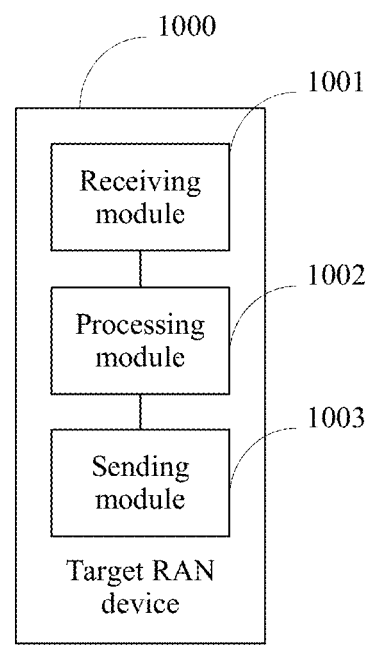
FIG. 10 is another schematic block diagram of a target RAN device according to an embodiment of this application.

FIG. 10 is a schematic block diagram of a communications apparatus 1000 according to an embodiment of this application. The communications apparatus 1000 may correspond to (for example, may be configured on or may be) the target RAN device described in the foregoing method embodiments. The communications apparatus 1000 may include a receiving module 1001, a processing module 1002, and a sending module 1003. The processing module 1002 is separately communicatively connected to the receiving module 1001 and the sending module 1003. The modules or units in the communications apparatus 1000 are separately configured to perform actions or processing processes performed by the target RAN device in the foregoing method embodiments. To avoid repetition, detailed descriptions thereof are omitted herein.

Figure 11:
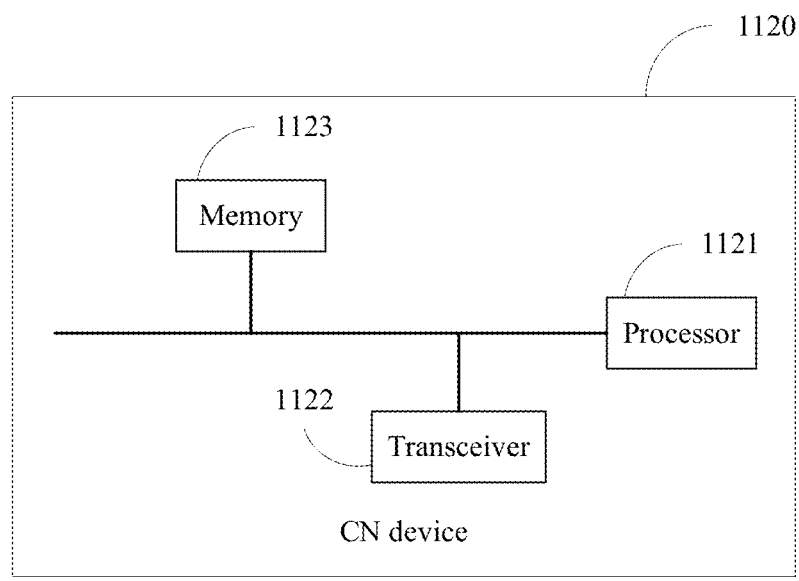
FIG. 11 is a schematic block diagram of a CN device according to an embodiment of this application.

FIG. 11 is a schematic block diagram of a communications apparatus 1120 according to an embodiment of this application. The communications apparatus 1120 may correspond to (for example, may be configured on or may be) the CN device described in the foregoing method embodiments. The communications apparatus 1120 may include a processor 1121 and a transceiver 1122. The processor 1121 and the transceiver 1122 are communicatively connected. Optionally, the communications apparatus 1120 further includes a memory 1123. The memory 1123 is communicatively connected to the processor 1121. Optionally, the processor 1121, the memory 1123, and the transceiver 1122 may be communicatively connected. The memory 1123 may be configured to store an instruction. The processor 1121 is configured to execute the instruction stored in the memory 1123, to control the transceiver 1122 to send information or a signal. The processor 1121 and the transceiver 1122 are separately configured to perform actions or processing processes performed by the CN device in the foregoing method embodiments. To avoid repetition, detailed descriptions thereof are omitted herein.

Figure 12:
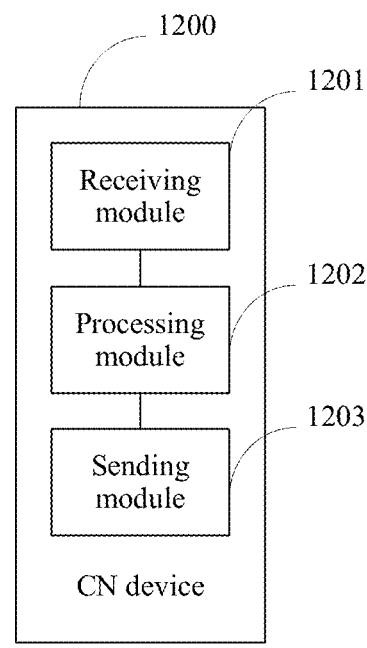
FIG. 12 is another schematic block diagram of a CN device according to an embodiment of this application.

FIG. 12 is a schematic block diagram of a communications apparatus 1200 according to an embodiment of this application. The communications apparatus 1200 may correspond to (for example, may be configured on or may be) the CN device described in the foregoing method embodiments. The communications apparatus 1200 may include a receiving module 1201, a processing module 1202, and a sending module 1203. The processing module 1202 is separately communicatively connected to the receiving module 1201 and the sending module 1203. The modules or units in the communications apparatus 1200 are separately configured to perform actions or processing processes performed by the CN device in the foregoing method embodiments. To avoid repetition, detailed descriptions thereof are omitted herein.

It should be understood that the processor (701, 901, and 1121) in the apparatus embodiments of this application may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The memory (703, 903, and 1123) in the apparatus embodiments of this application may be a volatile memory, such as a random access memory (RAM); may be a nonvolatile memory, such as a read-only memory (ROM), a flash memory, a hard disk drive (HDD), or a solid-state drive (SSD); or may be a combination of the foregoing types of memories.

It should be understood that the apparatuses and methods disclosed in the several embodiments provided in this application may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When functions are implemented in the form of a software functional unit and sold or used as an independent product, the functions may be stored in a computer-readable storage medium. Based on such an understanding, the technical solutions of this patent application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this patent application. The storage medium includes any medium that can store program code, such as a USB flash drive, a removable hard disk, a read-only memory (ROM), a random access memory (RAM), a magnetic disk, or a compact disc.

The foregoing are merely specific implementations of this patent application, but are not intended to limit the protection scope of this patent application. Any variation or replacement readily figured out by a person skilled in the art within the technical scope disclosed in this patent application shall fall within the protection scope of this patent application. Therefore, the protection scope of this patent application shall be subject to the protection scope of the claims.

What is claimed is:

1. A method for data transmission in a handover process, wherein the method comprises:
   configuring, by a source radio access network (RAN) device for a terminal device, a first mapping relationship between downlink transmission of a quality of service (QoS) flow and a first data radio bearer (DRB) and a second mapping relationship between uplink transmission of the QoS flow and a second DRB;
   notifying, by the source RAN device by using air interface signaling, the terminal device of the second mapping relationship between the uplink transmission of the QoS flow and the second DRB;
   sending, by the source RAN device, a handover request message to a target RAN device, or sending, by the source RAN device, a handover requirement message to a core network (CN) device,
   wherein the handover request message or the handover requirement message comprises the first mapping relationship between the downlink transmission of the QoS flow and the first DRB and the second mapping relationship between the uplink transmission of the QoS flow and the second DRB,
   wherein the first mapping relationship between the downlink transmission of the QoS flow and the first DRB is different from the second mapping relationship between the uplink transmission of the QoS flow and the second DRB; and
   forwarding, by the source RAN device, data of the QoS flow on the source RAN device to the target RAN device in a process in which a terminal device is handed over from the source RAN device to the target RAN device; wherein:
      the first mapping relationship between downlink transmission of the QoS flow and a first DRB comprises a mapping relationship between a QoS flow identifier (QFI) of the QoS flow and a DRB identifier (ID) of the first DRB; and
      the second mapping relationship between uplink transmission of the QoS flow and a second DRB comprises a mapping relationship between the QFI of the QoS flow and a DRB ID of the second DRB.

2. The method according to claim 1, wherein forwarding, by the source RAN device, the data of the QoS flow on the source RAN device to the target RAN device comprises:
   for the downlink transmission of the QoS flow, forwarding, by the source RAN device to the target RAN device, downlink data that is in the QoS flow on the first DRB and that is not correctly received by the terminal device.

3. The method according to claim 1, wherein forwarding, by the source RAN device, the data of the QoS flow on the source RAN device to the target RAN device comprises:
   for the uplink transmission of the QoS flow, forwarding, by the source RAN device to the target RAN device, uplink data that is in the QoS flow on the second DRB and that is received out-of-sequence.

4. A method for data transmission in a handover process, wherein the method comprises:
   configuring, by a source radio access network (RAN) device for a terminal device, a first mapping relationship between downlink transmission of a quality of service (QoS) flow and a first data radio bearer (DRB)

and a second mapping relationship between uplink transmission of the QoS flow and a second DRB;

notifying, by the source RAN device by using air interface signaling, the terminal device of the second mapping relationship between the uplink transmission of the QoS flow and the second DRB;

receiving, by a target radio access network (RAN) device, a handover request message from the source RAN device or from a core network (CN) device, wherein the handover request message comprises the first mapping relationship between the downlink transmission of the QoS flow and the first DRB and the second mapping relationship between the uplink transmission of the QoS flow and the second DRB, wherein the first mapping relationship between the downlink transmission of the QoS flow and the first DRB is different from the second mapping relationship between the uplink transmission of the QoS flow and the second DRB;

in a process in which the terminal device is handed over from the source RAN device to the target RAN device, receiving, by the target RAN device, data that is of the QoS flow, that is on the source RAN device, and that is forwarded by the source RAN device;

sending, by the target RAN device, downlink data based on the first mapping relationship between the downlink transmission of the QoS flow and the first DRB; and receiving, by the target RAN device, uplink data based on the second mapping relationship between the uplink transmission of the QoS flow and the second DRB; wherein:

the first mapping relationship between the downlink transmission of the QoS flow and the first DRB comprises a mapping relationship between a QoS flow identifier (QFI) of the QoS flow and a DRB identifier (ID) of the first DRB; and the second mapping relationship between the uplink transmission of the QoS flow and the second DRB comprises a mapping relationship between the QFI of the QoS flow and a DRB ID of the second DRB.

5. The method according to claim 4, wherein receiving, by the target RAN device, the data that is of the QoS flow, that is on the source RAN device, and that is forwarded by the source RAN device comprises:

for the downlink transmission of the QoS flow, receiving, by the target RAN device, downlink data that is of the QoS flow on the first DRB, that is not correctly received by the terminal device, and that is forwarded by the source RAN device.

6. The method according to claim 4, wherein receiving, by the target RAN device, the data that is of the QoS flow, that is on the source RAN device, and that is forwarded by the source RAN device comprises:

for the uplink transmission of the QoS flow, receiving, by the target RAN device, uplink data that is of the QoS flow on the second DRB, that is received out-of-sequence, and that is forwarded by the source RAN device.

7. The method according to claim 5, wherein sending, by the target RAN device, the downlink data based on the first mapping relationship between the downlink transmission of the QoS flow and the first DRB comprises:

when the target RAN device does not change the first mapping relationship between the downlink transmission of the QoS flow and the first DRB, sending, by the target RAN device to the terminal device on the first DRB, the downlink data that is of the QoS flow, that is not correctly received by the terminal device, and that is forwarded by the source RAN device; and sending, by the target RAN device to the terminal device on the first DRB, other downlink data that is of the QoS flow and that is received from the CN device; or when the target RAN device changes the first mapping relationship between the downlink transmission of the QoS flow and the first DRB, sending, by the target RAN device to the terminal device on the first DRB, the downlink data that is of the QoS flow, that is not correctly received by the terminal device, and that is forwarded by the source RAN device; and sending, by the target RAN device to the terminal device on a third DRB, other downlink data that is of the QoS flow and that is received from the CN device.

8. The method according to claim 6, wherein receiving, by the target RAN device, the uplink data based on the second mapping relationship between the uplink transmission of the QoS flow and the second DRB comprises:

when the target RAN device does not change the second mapping relationship between the uplink transmission of the QoS flow and the second DRB, receiving, by the target RAN device on the second DRB, uplink data that is of the QoS flow, that is not correctly received by the source RAN device, and that is from the terminal device; and receiving, by the target RAN device on the second DRB, other uplink data that is of the QoS flow and that is from the terminal device; or when the target RAN device changes the second mapping relationship between the uplink transmission of the QoS flow and the second DRB, receiving, by the target RAN device on the second DRB, uplink data that is of the QoS flow, that is not correctly received by the source RAN device, and that is from the terminal device; and receiving, by the target RAN device on a fourth DRB, other uplink data that is of the QoS flow and that is from the terminal device.

9. A mobile communication system, wherein the mobile communication system comprises:

a first network device and a second network device, wherein:

the first network device is a source radio access network (RAN) device, wherein the source RAN device comprises at least one first processor, one or more first non-transitory memories, and a first transceiver, wherein:

the at least one first processor is communicatively coupled to the first transceiver, wherein the one or more first non-transitory memories store first instructions for execution by the at least one first processor, wherein the first instructions instruct the at least one first processor to:

configure, for a terminal device, a first mapping relationship between downlink transmission of a quality of service (QoS) flow and a first data radio bearer (DRB) and a second mapping relationship between uplink transmission of the QoS flow and a second DRB; and notify, by using air interface signaling, the terminal device of the second mapping relationship between the uplink transmission of the QoS flow and the second DRB;
the first instructions further instruct the at least one first processor to instruct the first transceiver to send a handover request message to a target RAN device or send a handover requirement message to a core network (CN) device,
wherein the handover request message or the handover requirement message comprises the first mapping relationship between the downlink transmission of the QoS flow and the first DRB and the second mapping relationship between the uplink transmission of the QoS flow and the second DRB,
wherein the first mapping relationship between the downlink transmission of the QoS flow and the first DRB is different from the second mapping relationship between the uplink transmission of the QoS flow and the second DRB; and
the first instructions further instruct the at least one first processor to instruct the first transceiver to forward data of the QoS flow on the source RAN device to the target RAN device in a process in which a terminal device is handed over from the source RAN device to the target RAN device; and
the second network device is a target RAN device, wherein the target RAN device comprises at least one second processor, one or more second non-transitory memories, and a second transceiver, wherein:
the at least one second processor is communicatively coupled to the second transceiver, wherein the one or more second non-transitory memories store second instructions for execution by the at least one second processor, wherein the second instructions instruct the at least one second processor to instruct the second transceiver to receive the handover request message from the source RAN device or from the CN device;
the second instructions further instruct the at least one second processor to instruct the second transceiver to receive, in a process in which the terminal device is handed over from the source RAN device to the target RAN device, data that is of the QoS flow, that is on the source RAN device, and that is forwarded by the source RAN device;
the second instructions further instruct the at least one second processor to instruct the second transceiver to send downlink data based on the first mapping relationship between the downlink transmission of the QoS flow and the first DRB; and
the second instructions further instruct the at least one second processor to instruct the second transceiver to receive uplink data based on the second mapping relationship between the uplink transmission of the QoS flow and the second DRB; wherein:
the first mapping relationship between the downlink transmission of the QoS flow and the first DRB comprises a mapping relationship between a QoS flow identifier (QFI) of the QoS flow and a DRB identifier (ID) of the first DRB; and
the second mapping relationship between the uplink transmission of the QoS flow and the second DRB comprises a mapping relationship between the QFI of the QoS flow and a DRB ID of the second DRB.

10. The mobile communication system according to claim 9, wherein the first instructions further instruct the at least one first processor to instruct the first transceiver to forward data of the QoS flow on the source RAN device to the target RAN device comprises:
for the downlink transmission of the QoS flow, the first instructions instruct the at least one first processor to instruct the first transceiver to forward to the target RAN device, downlink data that is of the QoS flow on the first DRB and that is not correctly received by the terminal device.

11. The mobile communication system according to claim 9, wherein the first instructions further instruct the at least one first processor to instruct the first transceiver to forward data of the QoS flow on the source RAN device to the target RAN device comprises:
for the uplink transmission of the QoS flow, the first instructions instruct the at least one first processor to instruct the first transceiver to forward to the target RAN device, uplink data that is of the QoS flow on the second DRB and that is received out-of-sequence.

12. The mobile communication system according to claim 9, wherein that the second instructions further instruct the at least one second processor to instruct the second transceiver to receive data that is of the QoS flow, that is on the source RAN device, and that is forwarded by the source RAN device comprises:
for the downlink transmission of the QoS flow, the second instructions instruct the at least one second processor to instruct the second transceiver to receive downlink data that is of the QoS flow on the first DRB, that is not correctly received by the terminal device, and that is forwarded by the source RAN device.

13. The mobile communication system according to claim 9, wherein that the second instructions further instruct the at least one second processor to instruct the second transceiver to receive data that is of the QoS flow, that is on the source RAN device, and that is forwarded by the source RAN device comprises:
for the uplink transmission of the QoS flow, the second instructions instruct the at least one second processor to instruct the second transceiver to receive uplink data that is of the QoS flow on the second DRB, that is received out-of-sequence, and that is forwarded by the source RAN device.

14. The mobile communication system according to claim 12, wherein that the second instructions further instruct the at least one second processor to instruct the second transceiver to send downlink data based on the first mapping relationship between the downlink transmission of the QoS flow and the first DRB comprises:
when the at least one second processor does not change the first mapping relationship between the downlink transmission of the QoS flow and the first DRB, the second instructions instruct the at least one second processor to:
instruct the second transceiver to send, to the terminal device on the first DRB, the downlink data that is of the QoS flow, that is not correctly received by the terminal device, and that is forwarded by the source RAN device; and instruct the second transceiver to send, to the terminal device on the first DRB, other downlink data that is of the QoS flow and that is received from the CN device; or when the at least one second processor changes the first mapping relationship between the downlink transmission of the QoS flow and the first DRB, the second instructions instruct the at least one second processor to:

instruct the second transceiver to send, to the terminal device on the first DRB, the downlink data that is of the QoS flow, that is not correctly received by the terminal device, and that is forwarded by the source RAN device; and instruct the second transceiver to send, to the terminal device on a third DRB, other downlink data that is of the QoS flow and that is received from the CN device.

15. The mobile communication system according to claim 13, wherein that the second instructions further instruct the at least one second processor to instruct the second transceiver to receive uplink data based on the second mapping relationship between the uplink transmission of the QoS flow and the second DRB comprises:

when the at least one second processor does not change the second mapping relationship between the uplink transmission of the QoS flow and the second DRB, the second instructions instruct the at least one second processor to:

instruct the second transceiver to receive, on the second DRB, uplink data that is of the QoS flow, that is not correctly received by the source RAN device, and that is sent by the terminal device; and instruct the second transceiver to receive, on the second DRB, other uplink data that is of the QoS flow and that is sent by the terminal device; or when the at least one second processor changes the second mapping relationship between the uplink transmission of the QoS flow and the second DRB, the second instructions instruct the at least one second processor to:

instruct the second transceiver to receive, on the second DRB, uplink data that is of the QoS flow, that is not correctly received by the source RAN device, and that is sent by the terminal device; and instruct the second transceiver to receive, on a fourth DRB, other uplink data that is of the QoS flow and that is sent by the terminal device.

16. A non-transitory computer-readable storage medium storing computer instructions, that when executed by one or more first processors, cause the one or more first processors to perform operations comprising:

configuring, by a source radio access network (RAN) device for a terminal device, a first mapping relationship between downlink transmission of a quality of service (QoS) flow and a first data radio bearer (DRB) and a second mapping relationship between uplink transmission of the QoS flow and a second DRB;

notifying, by the source RAN device by using air interface signaling, the terminal device of the second mapping relationship between the uplink transmission of the QoS flow and the second DRB;

sending, by the source RAN device, a handover request message to a target RAN device, or sending, by the source RAN device, a handover requirement message to a core network (CN) device, wherein the handover request message or the handover requirement message comprises the first mapping relationship between the downlink transmission of the QoS flow and the first DRB and the second mapping relationship between the uplink transmission of the QoS flow and the second DRB, wherein the first mapping relationship between the downlink transmission of the QoS flow and the first DRB is different from the second mapping relationship between the uplink transmission of the QoS flow and the second DRB; and forwarding, by the source RAN device, data of the QoS flow on the source RAN device to the target RAN device in a process in which a terminal device is handed over from the source RAN device to the target RAN device;

wherein the computer instructions, that when executed by one or more second processors, further cause the one or more second processors to perform operations comprising:

receiving, by the target RAN device, the handover request message from the source RAN device or from the CN device, wherein the handover request message comprises the first mapping relationship between the downlink transmission of the QoS flow and the first DRB and the second mapping relationship between the uplink transmission of the QoS flow and the second DRB, wherein the first mapping relationship between the downlink transmission of the QoS flow and the first DRB is different from the second mapping relationship between the uplink transmission of the QoS flow and the second DRB;

in a process in which the terminal device is handed over from the source RAN device to the target RAN device, receiving, by the target RAN device, the data that is of the QoS flow, that is on the source RAN device, and that is forwarded by the source RAN device;

sending, by the target RAN device, downlink data based on the first mapping relationship between the downlink transmission of the QoS flow and the first DRB; and receiving, by the target RAN device, uplink data based on the second mapping relationship between the uplink transmission of the QoS flow and the second DRB;

wherein:

the first mapping relationship between the downlink transmission of the QoS flow and the first DRB comprises a mapping relationship between a QoS flow identifier (QFI) of the QoS flow and a DRB identifier (ID) of the first DRB; and the second mapping relationship between the uplink transmission of the QoS flow and the second DRB comprises a mapping relationship between the QFI of the QoS flow and a DRB ID of the second DRB.

* * * * *

UNITED STATES PATENT AND TRADEMARK OFFICE
CERTIFICATE OF CORRECTION

| | |
|---|---|
| PATENT NO. | : 11,457,392 B2 |
| APPLICATION NO. | : 17/111200 |
| DATED | : September 27, 2022 |
| INVENTOR(S) | : Xingxing Hu and Hongping Zhang |

It is certified that error appears in the above-identified patent and that said Letters Patent is hereby corrected as shown below:

On the Title Page

Column 2 (Other Publications) In Line 2, Delete "Young-Il" and insert -- Young-II --.

Signed and Sealed this
Twenty-fifth Day of April, 2023

Katherine Kelly Vidal
*Director of the United States Patent and Trademark Office*